April 14, 1942.  F. P. SMITH  2,279,646
DEVICE FOR MAKING SPECTRAL ANALYSES
Filed Jan. 31, 1939   3 Sheets-Sheet 1
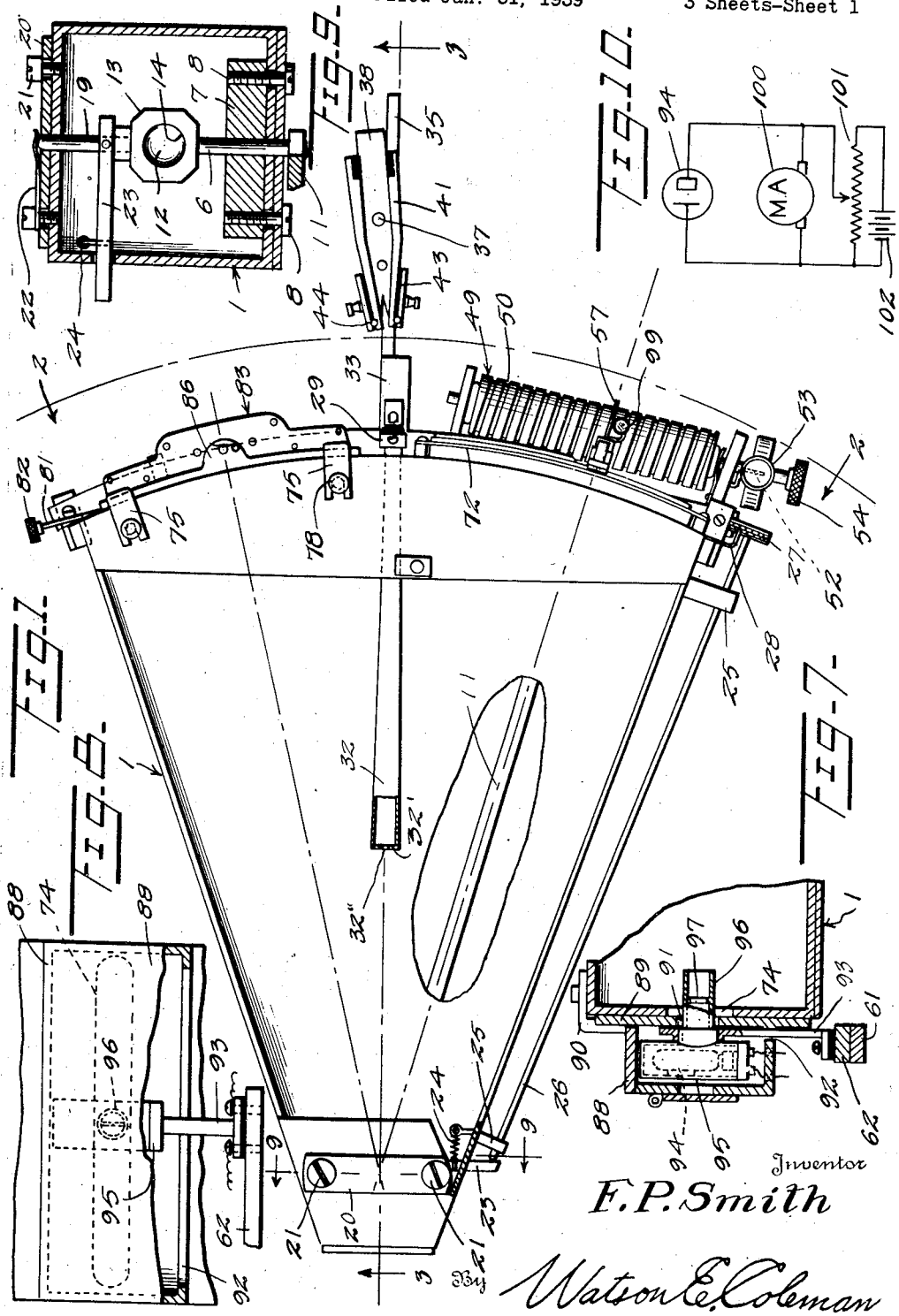

April 14, 1942.　　　F. P. SMITH　　　2,279,646
DEVICE FOR MAKING SPECTRAL ANALYSES
Filed Jan. 31, 1939　　　3 Sheets-Sheet 2
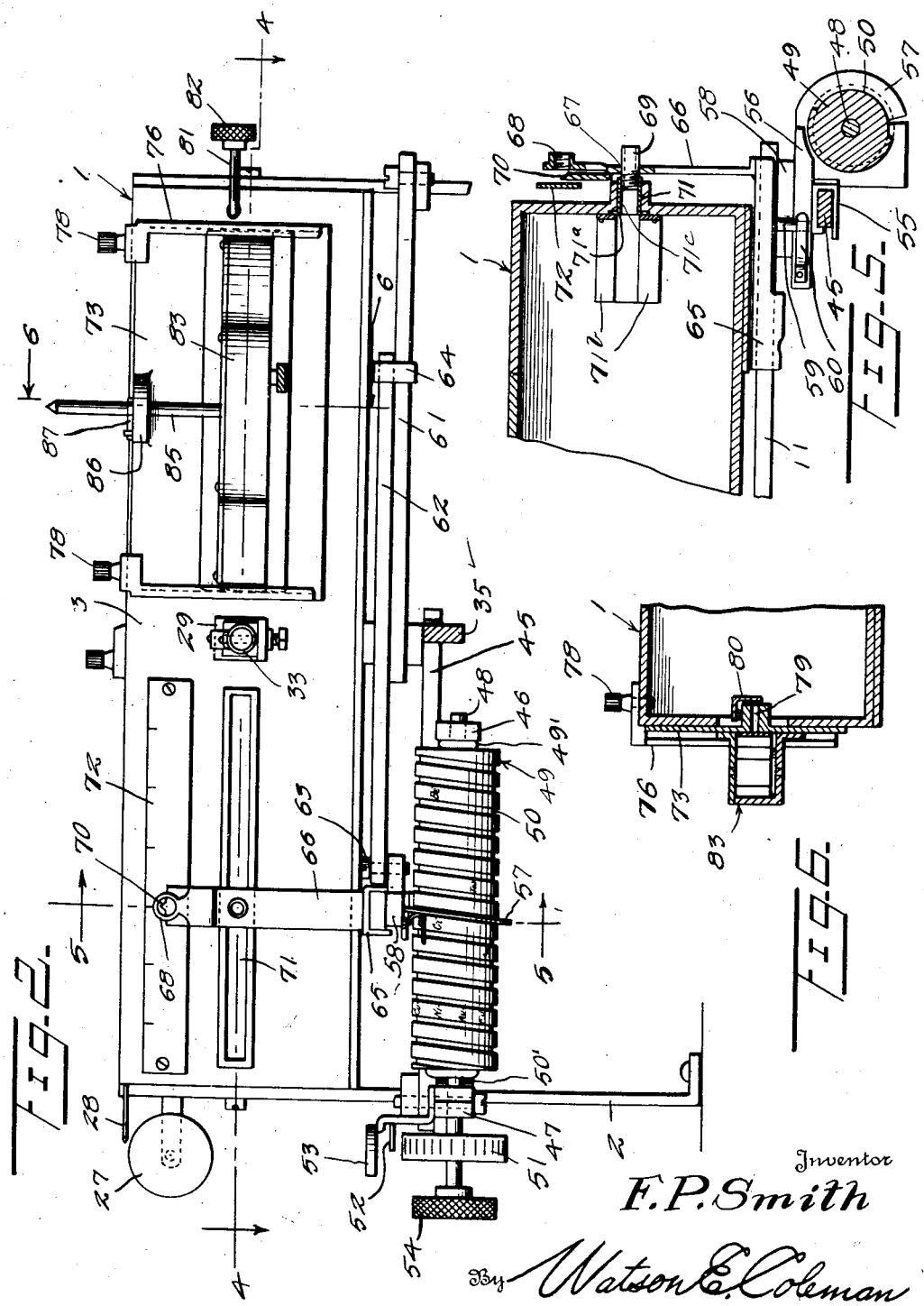
Inventor
F. P. Smith
By Watson E. Coleman
Attorney April 14, 1942.   F. P. SMITH   2,279,646
DEVICE FOR MAKING SPECTRAL ANALYSES
Filed Jan. 31, 1939   3 Sheets-Sheet 3
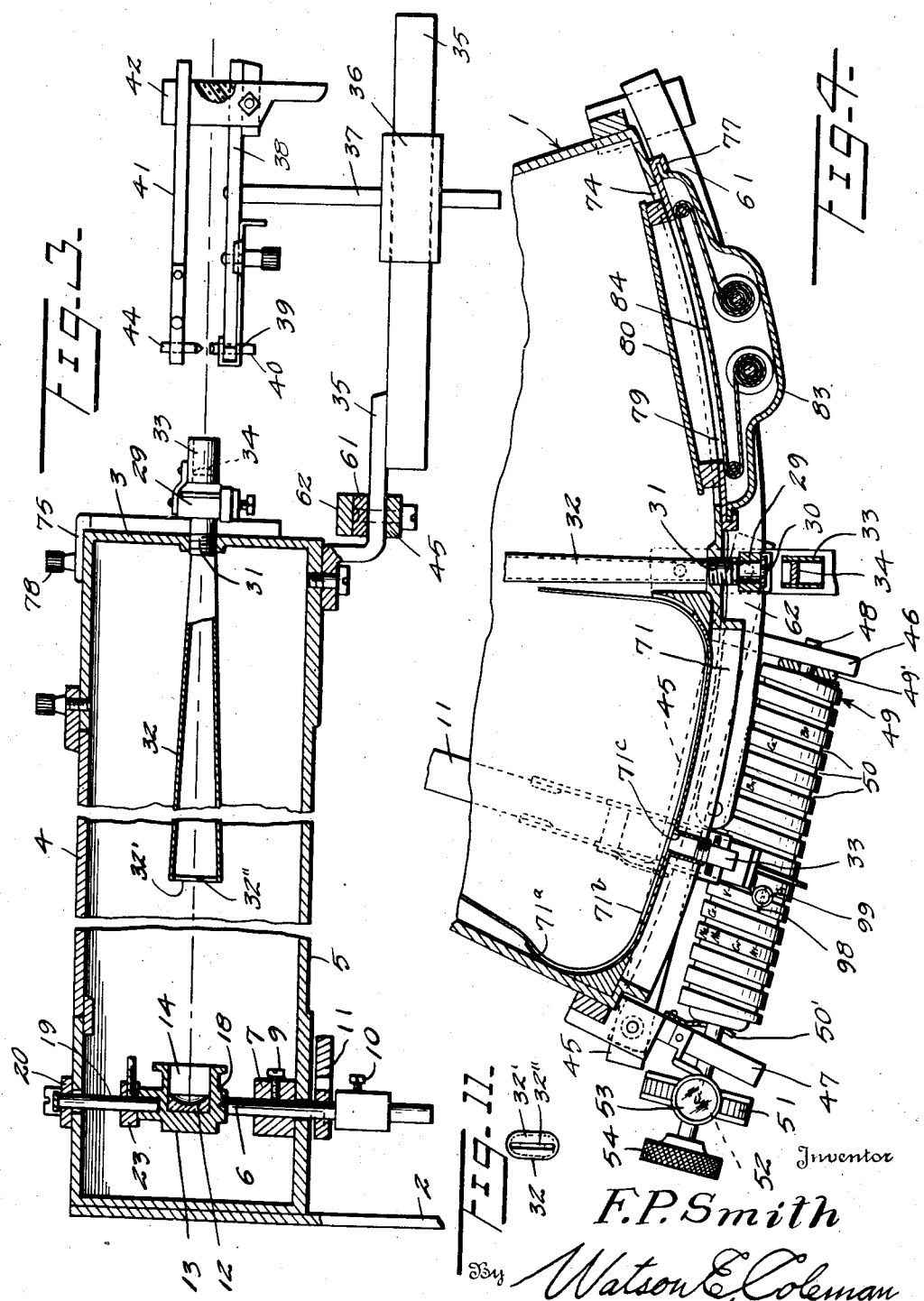

Patented Apr. 14, 1942

2,279,646

UNITED STATES PATENT OFFICE 2,279,646

DEVICE FOR MAKING SPECTRAL ANALYSES

Frank P. Smith, Silver City, N. Mex.

Application January 31, 1939, Serial No. 253,916

15 Claims. (Cl. 88—14)

This invention relates to an improved mechanism for the making of spectral analyses and pertains particularly to a novel means for accomplishing a number of desirable objects in connection with such analyses.

The primary object of the present invention is to provide a novel device for facilitating the making of a spectral analysis by the provision of means whereby a particular element in the specimen under examination will be identified upon a scale simultaneously with the alinement of a movable sight member with the spectral line formed by such element.

Another object of the invention is to provide in a mechanism of the above described character, means whereby a photographic record may be conveniently made of a spectrum or a series of lines making up the same produced by elements in a specimen subjected to an electric arc, without materially changing any of the parts of the apparatus, thus making it possible for the analyst to not only visually identify the lines produced in the spectral flame by the substance, but to also form a permanent record of such lines with the same machine or apparatus employed for making the visual identification.

Still another object of the invention is to provide in an analyzing mechanism of the character described, a novel means whereby identification of spectral lines may be made by means of a light sensitive element, such as a photo-electric cell, such cell being employed for energizing an electrical instrument simultaneously with the picking up of the light from a spectral line, the element forming such spectral line by which instrument fluctuation is brought about, being identified upon a scale associated with the light sensitive element.

Still another object of the invention is to provide in an instrument of the above described character, novel means for reading a spectrograph made or produced by the instrument, such means for reading the spectrograph and for identifying spectral lines directly, being of such character that the performance of mathematical calculations is entirely avoided.

A further and more specific object of the invention is to provide a spectrometer having in association with a suitable means for forming a spectrum, a scanning eye-piece and a novel rotary scale operatively connected with the eye-piece upon which an element contained in a specimen under analysis may be immediately identified when such scanning eye-piece is brought into focus upon the spectral line produced by such element in the electric arc or other analyzing flame of the apparatus.

Other objects and advantages will become apparent as the description proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in top plan of the apparatus embodying the present invention, a portion of the top of the housing thereof being removed and a portion of the under structure being broken away.

Fig. 2 is a sectional view taken on the line 2—2 of Fig. 1, showing the apparatus in front elevation.

Fig. 3 is a longitudinal sectional view on the line 3—3 of Fig. 1, the central portion of the apparatus being broken away transversely.

Fig. 4 is a horizontal section on the line 4—4 of Fig. 2.

Fig. 5 is a section on the line 5—5 of Fig. 2.

Fig. 6 is a section on the line 6—6 of Fig. 2.

Fig. 7 is a sectional view similar to Fig. 6, but showing a replaceable unit for the unit shown in Fig. 6.

Fig. 8 is a view in front elevation of the replaceable unit shown in Fig. 7, a portion of such unit being broken away.

Fig. 9 is a section on the line 9—9 of Fig. 1.

Fig. 10 is a circuit diagram for the light sensitive cell shown in Fig. 7.

Fig. 11 is a view in elevation of the end of the light beam tube.

Referring now more particularly to the drawings, the numeral 1 generally designates a housing or casing which is here illustrated as being substantially triangular in outline, such casing being relatively flat and supported upon suitable legs or other supporting units 2, the apex portion of the housing constituting the rear thereof while the front vertical wall extending transversely of the housing and generally indicated by the numeral 3 has mounted thereon certain units made use of in the operation of making an analysis, as hereinafter described. The top wall of the housing has a removable cover portion indicated by the numeral 4 in Fig. 3, this cover being shown removed in Fig. 1. The interior of the housing will, of course, be black, so that all possibility of reflected light rays interfering with the operation of the apparatus, will be avoided.

At the rear or apex portion of the housing, the bottom 3 has extended therethrough the vertical pivot post 6. This post passes through a supporting block 7, which is secured at opposite sides of the post to the bottom wall by suitable securing screws 8, which pass through apertures in the bottom wall, as shown in Fig. 9, which are of materially greater diameter than the screws so that slight adjustments of the block 7 may be made, if necessary. The post 6 is secured to the block 7 by a set screw 9 shown in Fig. 3, and at the underside of the casing this post has secured thereto a collar 10, which supports one end of a bar 11 which extends forwardly to a point adjacent the front wall 3 for the purpose hereinafter described, the bar 11 having the post 6 extended therethrough.

Within the housing and disposed upon the longitudinal center of the same, there is mounted upon the upper end of the post 6, a suitable unit for forming the desired spectrum when there is directed thereonto a light beam originating from an arc in which has been placed a substance for analysis. This unit may consist of a diffraction grating or any other well-known type of spectrum producing means, and the body here shown as part of the unit is more or less diagrammatically illustrated as a concave diffraction grating designated generally by the numeral 12 and supported in a suitable housing body 13, one side of which is provided with a window 14, which is directed toward the front of the housing 1. When a diffraction grating of the type shown is employed, the concave face of the same is so designed that when a light beam is directed axially thereagainst from a source as hereinafter described, the spectra produced may be viewed from either of two positions at the front of the housing and on opposite sides of the incident beam. If a prism is employed in place of the diffraction grating, then the housing must be oscillated for viewing the spectra from the two positions stated, which oscillation is accomplished in the manner hereinafter described.

The upper end of the post 6 is shown as having a bearing point 18 which engages in a suitable bearing socket in the underside of the grating housing and the top of the grating housing has secured thereto the upwardly extending post 19 which passes through the top wall of the main housing 1 and into a bearing plate 20. The opening of the top wall of the main housing through which this post extends is materially larger than the post so that desired angular adjustments may be made of the post by shifting the bearing 20, and this bearing is secured to the top wall of the housing by screws 21, as shown in Fig. 9.

A spring 22 is arranged to bear down upon the upper end of the post 19, so as to prevent any vertical movement of the grating or other body which may be employed for producing the spectral lines.

Secured to the upper post 19 of the oscillatable unit by which the spectral lines are produced, is a control lever 23 which extends laterally through a suitable opening in the adjacent side wall of the housing 1, and this lever is engaged by or connected with a suitable spring 24 which constantly urges it to swing forwardly. Mounted upon the same side of the housing 1 through which the lever 23 extends, in suitable bearings 25, as shown in Fig. 1, is a control screw 26 which at its rear end bears against the lever 23 while at its forward end it carries a head or knob 27, the surface of which is calibrated for use in association with a fixed pointer 28. These calibrations are in Angstrom units and when a prism is employed in the optical unit by which the spectra is produced, this mechanism enables the operator of the instrument to move the entire spectra a known number of units so that the spectra produced may be adjusted with respect to certain other hereinafter described parts of the instrument so that accurate readings of the spectra may be obtained.

The front wall of the housing 1 carries the light receiver unit 29, the front of which is provided with the usual adjustable light slit which is common in spectrometers and, therefore, it is not believed that this unit 29 requires any further detailed description. The rear of this unit is in the form of a tube 31 which is secured in the wall 3 at the longitudinal center of the housing and is connected with the relatively long light tube 32 which extends along the longitudinal center of and within the housing on the axis of the window 14 and of the grating 12. This tube is shaped so that it gradually merges from a circular form at its outer end to an elliptical form at its inner end with the long axis of the ellipse vertical and the said inner end is closed by the wall 32' and is provided with the vertical slit 32'' which is parallel and in line with the slit 30 of the light receiving unit.

Secured to the light receiving unit 29 is a lens tube 33 in which a suitable lens 34 is mounted, this tube being directed toward the light slit 30, as shown in Fig. 4. While the light receiving lens tube and lens may have their proportions varied as may be required, the average apparatus would call for a plus spherical lens having a 5" focal length and placed approximately 1¼" from the light slit.

Secured to the casing 1 and extending forwardly therefrom is a fixed arm 35 on which is mounted a suitable sliding clamp 36 supporting a vertically adjustable post 37. This post carries the electrodes by which the electric arc is formed in which the material to be analyzed is placed and while any suitable apparatus may be employed for producing such arc, the mechanism here shown comprises a bar 38 supported horizontally upon the upper end of the post 37 and having at one end a double clamp unit 39 for the support of two fixed carbon electrodes, one of which is indicated by the numeral 40. These electrodes 40 have their upper ends cupped to receive the material for analysis. Supported above the fixed bar 38 are two vertically swingable electrode carrying bars 41, each of which is supported from the rear end of the fixed bar 38 by a suitable insulation body 42. The bodies 42 are connected to the bars 41 at one end of the latter and the other end of each of the shiftable bars 41 is formed as shown in Fig. 1, to form a clamp 43 in which is secured a downwardly extending carbon electrode 44. Each of these latter electrodes is directed toward the cupped upper end of one of the electrodes 40 and the adjacent ends of the electrodes are alined with the tube 33 when the apparatus is in use so that the light from the flame produced will pass through the lens 34 and the slit 30 to the diffraction grating through the tube 32.

Fixed beneath the housing 1 and secured to and extending laterally from the electrode supporting beam or arm 35, is a straight slide bar 45. The outer or lateral end of this bar is secured in any suitable manner to the adjacent housing supporting post 2. Extending forwardly from this fixed bar 45 are bearing arms 46 and 47 and supported by these arms is a rotary shaft 48 upon which is mounted between the arms, a cylinder 49 having the helical groove 50 formed therein from one end of the same to the other. Between the convolutions of the groove 50, the cylinder surface is flat and on the flattened convolutions between the convolutions of the groove are placed chemical symbols for the various elements, as shown. Upon the outer end of shaft 48 is an index drum 51 over which lies a fixed pointer 52, and supported above this pointer is a magnifying glass 53 to make easy the reading of the calibrations upon the drum. This index drum will show even numbers of Angstrom units and will be employed as hereinafter described, for the identification of spectral lines where such identification does not occur upon the grooved cylinder. The outer end of shaft 48 also carries the knurled head 54 by means of which the turning of the cylinder and the index wheel is facilitated.

To prevent longitudinal play of drum 49, a bearing 49' is inserted at one end, as shown, while at the other end of the drum, a spring 50' is secured to the bearing arm to bear against the adjacent end of the drum and urge the same against the bearing.

Mounted upon the slide bar 45 is a sliding member 55 to which is attached an elongated plate 56 which extends transversely of the slide bar 45 and has its forward end overlying the symbol carrying cylinder 49. This plate forms a coupling means between the sliding member 55 and the cylinder through the medium of the helical collar 57, which it carries and which engages in the groove 50 of the cylinder.

The forward end of the bar 11, which may be termed the radius bar, extends over the plate 56 and is supported thereby, there being interposed between the plate and the radius bar 11, the block 58 which carries upon one side the downwardly extending finger 59. This finger is held against the adjacent side of the plate 56 by the spring finger 60, as shown in Fig. 5, so that there is thus established a sliding connection between the radius bar 11 and the plate 56, which is free of lateral or side play.

Secured between the forwardly extending arm 35 and the leg 2 at the opposite side of the apparatus from the cylinder 49, is a fixed arcuate slide bar 61. Resting upon the top of this arcuate slide bar is a sliding bar which is also arcuate and which has the same curvature as the bar 61, the sliding bar being indicated by the numeral 62. One end of the sliding bar 62 is pivotally attached, as at 63, to the body 58, while the other end has a collar 64 thereabout, which also encircles the fixed slide bar 61, as shown in Fig. 2, so that as the sliding bar is moved transversely of the casing 1, it will shift upon the top of the fixed bar 61. The curvature of these bars 61 and 62 is, as previously stated, the same, and they are struck from an arc having the post 6 for its center, about which post the beam 11 swings.

Supported upon the top of the beam 11 at the forward end thereof is a rider plate 65 which is adapted to move longitudinally on the beam 11 and which carries a vertical support upon its forward end, as indicated at 66, which support is provided with suitable apertures arranged one above the other, as indicated at 67 and 68 in Fig. 5, for the selective reception of a sight tube 69, in which is carried a lens having fixed thereacross a cross hair similar to the sight of a transit or similar instrument. This upright 66 which carries the sight tube 69 is also formed at its upper end to provide the inset pointer 70, the tip of which is in line with the center of the upper opening 68 for the purpose hereinafter described.

The portion of the front wall 3 of the housing 1 which lies above the slide bar 45 is provided with a horizontal arcuate window 71, the radial center of which is the center of oscillation of the optical unit supporting post 6.

Extending lengthwise of this window 71 is a resilient band 71ª which, as shown in Fig. 4, is of a length materially greater than the window and this band has its longitudinal edges slidably disposed in suitable recesses in the inner side of the housing front wall and retained in such recesses by the guide strips 71ᵇ which, as shown in Fig. 5, are vertically spaced a distance at least as great as the height of the window opening 71.

Substantially midway of its ends this strip 71ª which is of light weight resilient metal, is provided with an outwardly extending sight tube extension 71ᶜ which projects through the window 71 and is interiorly threaded to receive the end of the cross hair and lens carrying sight tube 69 when the latter is extended through the aperture 67 of the supporting post 66, as shown in Fig. 5. Thus it will be seen that when the post 66 is moved across the face of the housing, its connection through the sight tube 69 with the window closing band 71ª will cause this band to slide lengthwise so that the window opening will be kept closed on both sides of the sight tube so as to prevent the entrance of light into the housing. By this construction, the sight tube can be readily moved from one end of the window to the other for scanning the spectra produced by the diffraction grating or by a prism, without allowing light to enter the housing.

Above the window 71, the front wall of the casing or housing 1 has secured thereto and in spaced relation therewith, the arcuate transparent or translucent plate 72. This plate has laid out thereon a suitable scale for facilitating the reading of a spectrographic film which may be secured to the indexed plate by suitable fastening means and when such a film is read, use is made of the eye-piece or tube 69 by transferring it to the upper opening 68 so that the cross hairs thereof may be brought exactly in alinement with a spectral line upon the film. The method of identifying the lines of the film in this manner will be hereinafter more particularly described.

The film supporting plate 72 is set forwardly from the adjacent wall of the casing so that sufficient light may pass through the plate and the film. If necessary, suitable means may be provided for supplying artificial light behind this plate.

At the opposite side of the longitudinal center of the casing 1 from the scanning slot 71, means is provided for making a spectrograph which comprises an arcuate plate 73, which is detachably secured before the front wall 3 to cover a transversely extending horizontal slot 74, which is formed through the adjacent casing or housing wall. Any suitable means may be provided for supporting this plate 73, but the means here shown consists of two right angular arms 75, which are formed integral with the upper ends of reinforcing bars 76 which are secured along the opposite end edges of the plate 73 and which have their inner edge faces slotted, as indicated at 77, in Fig. 4. The arms 75 are secured by removable screws 78 which pass therethrough and into the top wall of the casing, so that the plate 73 is firmly held in position over the wall slot 74. The plate 73 is provided with a slot 79 which is alined with the wall slot 74 and this plate slot 79 is provided with a suitable shutter means, as shown in Fig. 6, and indicated by the numeral 80, whereby the slot may be closed against the passage of light therethrough. Any suitable means may be provided for shifting or opening this shutter, such as the supporting shaft shown in Figs. 2 and 6, and indicated by the numeral 81, which shaft passes laterally to the outside of the casing and is rotatable by means of the knob 82.

Slidably held against the outer face of the plate 73 is a film box or casing 83, which is designed, as shown in Fig. 4, so that a suitable strip film may be run across the alined slots 74—79 longitudinally thereof. The film which is indicated by the numeral 84, is of a width materially greater than the adjacent slot 79 and thus by vertically shifting the film box, a number of spectral bands may be photographed, disposed one above the other and extending lengthwise of the film for a distance equal to the lengths of the adjacent slots through which the exposure is made. While any suitable means may be made use of for holding the film box in its vertically adjusted position, the means here illustrated consists of a vertically extending pin 85 which projects upwardly from the box 83 through an ear 86 forming a part of the plate 73. The ear 86 carries a spring finger 87 which frictionally bears against the pin 85 and thus maintains it in the desired adjusted position.

In substitution for the photographing mechanism described, there may be used a photo-electric means for identifying the spectral lines produced by the diffraction grating or prism. In the use of such means there is provided a cell box 88, such as is shown in Figs. 7 and 8, which is integral with a supporting plate 89 which carries suitable attaching arms 90 which are adapted to be secured to the casing 1 by the screws 78 in the same manner as the attaching arms 75 of the photographing unit so that the plate 89 will be secured against the adjacent front wall 3 of the casing to cover the casing wall slot 74. The plate 89 also has a slot therein, as indicated at 91, in Fig. 7, which is alined with the casing wall slot 74 and the bottom wall of the box 88 is provided with a slot 92 which is formed on an arc corresponding with the arc or curvature of the underlying arcuate bars 61 and 62. The sliding bar 62 is provided with suitable means for facilitating the attachment thereto of a standard or arm 93 which extends upwardly through the cell box 88 to the interior thereof where it supports a suitable light sensitive element such as a photo-electric or selenium cell 94. A photo-electric cell is here diagrammatically shown, and also in Fig. 10, where a circuit diagram for this cell is illustrated, and this cell is placed within a suitable enclosing cylinder 95, which has as a part thereof a light ray receiving tube 96 which extends through the slots 74—91 into the housing and is directed toward the diffraction grating or prism at the rear of the housing. This tube has within it a diaphragm provided with a vertical slit 97, as shown in Fig. 7, through which the light rays pass to the elements of the photo-electric cell. As will be readily apparent, this cell is moved across the adjacent face of the housing 1 with the sliding arcuate bar 62 and the parts attached thereto. The tube 96 may be made of the same dimensions as the eye-piece 69 to be coupled with the standard 66 to be moved therewith along the window 74.

In the use of the mechanism thus described, a spectral analysis of a specimen may be made by placing the same between a pair of carbon electrodes 40 and 44 and subjecting it to the action of the electric arc, this arc being located, as previously stated, so that the light thereof will pass through the light receiving lens tube 33 and through the adjacent slit 30 to the tube 32 through which it passes to the diffraction grating 12 or to a suitable prism which may be used in place of this grating. If the diffraction grating is being employed, the casing or housing therefor will be set so that the axial center of the grating will be alined with the slit of the unit 29 and when in this position, the spectrum produced may be viewed from any part of the window 71 through the tube 69 or from any part of the slot 74 for exposure to the photographic film extending lengthwise of this slot, but if a prism is employed in the optical unit, then an adjustment may be necessary to view the spectrum through the eye-piece or for photographing, by manipulating the adjusting screw 26. The scanning operation is carried out by turning the cylinder 49 through the medium of the thumb knob 54 while looking through the eye-piece 69. When the cross hairs of the eye-piece are brought into position upon the center of a principal spectral line of an element, identification of the element producing such line may be readily made by referring to the part of the cylinder 49 lying directly beneath the pointer 98 which is carried by the movable structure supporting the eye-piece standard 66. A suitable magnifying element 99 may be disposed over the pointer 98 to facilitate identifying the chemical symbol of the element on the cylinder. The element producing the spectral line observed will be identified by its chemical symbol on the cylinder 49 beneath the pointer 98. If a spectrograph is desired of the spectral band, the necessary adjustment may be made of the optical unit by means of the control screw 26, if a prism is being used to facilitate exposing the band to the film strip 84 through the slots 74—79. This exposure would be made by lifting shutter 80. Otherwise, that is, if the diffraction grating is being employed and the grating has been set in the proper position initially, no adjustment would be necessary. Another method of identifying the spectral lines of the band produced by a substance in the electric arc would be by making a spectrographic record on the film and then placing the developed portion of the exposed film upon the indexed analyzing plate 72 and then shifting the eye-piece 69 to the upper opening 68 of the carrying standard and moving the eye-piece lengthwise of the film band by rotating the cylinder 49 in the manner previously described. When the hair of the eye-piece is brought into position upon a particular spectral line, it may be identified by reference to the pointer 98 and the cylinder as previously explained.

Analysis of material and identification of the substances producing certain spectral lines, by means of the photo-electric unit, is accomplished as follows. The cell 94 is connected in a suitable electric circuit, such as is shown in Fig. 10, which circuit includes a milli-ammeter 100 having connected therewith the necessary current control unit 101 and a source of electric potential 102. As previously stated, this cell 94 is supported upon the sliding bar 62, and therefore, the cell can be moved in the same arc as the eyepiece 69 by turning the cylinder 49. By watching the milli-ammeter 100 during the movement of the cell in its arcuate path, the fluctuation of the needle of the instrument will indicate when light from a spectral line has entered the slit 97 in the tube at the inner end of which the photo-electric cell is placed and by then referring to the pointer 98, the symbol of the element producing the spectral line, the light of which has affected the circuit in which the instrument 100 is located, will be found.

By providing the index drum 51 upon the shaft of the cylinder 49, provision is made for the identification of lines appearing in the spectrum, for which no identifying symbol has been provided upon the cylinder. As an illustration, should a line appear in the spectrum in a position between the two copper lines identified in Angstrom units as .5153 and .5106 and 20 A units are measured with the index wheel to the unknown line from .5153, and 27 A from the unknown line to .5106, the sum of these two figures 20 and 27 gives a total of 47, the difference between .5153 and .5106 and, therefore, the correct number of A between these two known numbers is proved and by then subtracting 20 from .5153, there will be obtained .5133 as the wave length of the unknown line. With the wave length thus obtained of the unknown substance, such substance may be identified by referring to a wave length table of the elements. The index wheel will be designed to register an even number of A units.

In addition to the above described means of identifying the spectra by the use of a light sensitive cell, such cell may be employed, as previously stated, in substitution for the eye-piece 69. It will be obvious, of course, that in the construction of the instrument where it is desired to use the photo-sensitive unit in place of the eye-piece, that the tube for the unit would have to be of the same diameter as the eye-piece tube 69 so that it could be readily threaded into the extension tube 71c of the window closing band. When the tube of the casing for the photo-electric cell or light sensitive unit is so connected with the tube 71c of the window closing band, it may then be moved lengthwise of the window by rotating the shaft 48 by means of the knob 54 and the fluctuations of the milli-ammeter will be noted as the light rays from the spectral lines affect the cell and the substances producing such spectral lines and the fluctuations of the meter will be identified upon the underlying drum as previously explained.

It will, of course, be apparent that the recording and scanning or reading units may be set at any degree or angle which may be required by the optical axis to obtain the proper focal point of the spectrum of any prism or grating which may be used.

As previously stated, the head 27 of the screw 26 is calibrated in A units and this screw is employed for moving the entire spectra a known number of such units when necessary. The symbol for sodium, Na, is the point on the drum that all other calibrations are based on. In operation, the sodium light beam, the cross hairs of the scanning eye-piece and the symbol on the drum have to be checked at each test to see that they line up, and if they do not, the knob 27 will be rotated until they coincide. Such checks may sometimes be necessary during the making of a test if the test consumes an unusual length of time as the spectra may shift due to variations in temperature. By means of the calibrations upon the knob 27, any part of the spectrum may be brought to a known point and the number of A units it has been moved will be known. The necessary feature is to know how many A units the spectra are moved by oscillating the prism or grating through the use of the indexed knob 27.

From the foregoing, it will be readily apparent that the apparatus herein described combines in one unit a spectroscope, spectrometer and spectrograph, together with a novel means of identifying the spectral lines which may be produced by the elements of an unknown substance under analysis, without requiring long mathematical deductions or comparison methods. With this apparatus the mechanism which makes the spectrogram may also be employed to read the same. In other words, a means is provided whereby a spectrogram may be read with a spectrometer by using the spectrometer measuring device.

What is claimed is:

1. An instrument of the character described, including a casing, and means for subjecting to a flame a specimen for analysis, means for receiving a light beam from such flame and conducting the same into the casing, an optical unit disposed in the casing in position to receive such light beam and formed to produce a spectral band therefrom, said casing having an elongated window in a wall thereof arranged at a point remote from the unit to receive reflected light rays from the unit, an eye-piece supported exteriorly of the casing for movement lengthwise of said window along an arcuate path having said unit at its radial center and directed toward the unit whereby said spectral band may be scanned, means for moving said eye-piece lengthwise of said window, a cylinder body rotatably supported adjacent to said eye-piece and having its axis of rotation extending lengthwise of the window, said cylinder body being provided with element identifying symbols arranged helically therearound, an operative coupling between the eye-piece and the cylinder body by which movement of the eye-piece lengthwise of the window and rotation of the cylinder are effected simultaneously, a pointer connected with said coupling and moving on a straight path axially of the cylinder and arranged to indicate element symbols upon the cylinder, a second cylinder supported for coaxial and simultaneous rotation with the first cylinder and having a wave length scale around its periphery, and a fixed pointer for the second cylinder.

2. In an apparatus of the character described for making a spectral analysis, a casing having a wall provided with a light slit, means for subjecting material for analysis to a flame before said slit, a light beam conducting tube extending from the slit partially through said casing toward the rear thereof, an optical unit disposed adjacent the rear of the casing in line with said tube and adapted to produce a spectral band from the light beam falling thereon, a window opening formed in the front wall of the casing at one side of said tube and having an arcuate curvature struck from the center of said optical unit, a scanning eye-piece supported before said window, means carrying said eye-piece for moving the same in the same arc as the window whereby a spectral band may be scanned, a cylinder rotatably supported beneath said eye-piece and extending lengthwise of said window, an operative connection between the cylinder and eye-piece whereby scanning movement of the eye-piece on said arcuate path and rotation of the cylinder are produced simultaneously, said cylinder having element identifying symbols arranged helically thereabout, a pointer carried by the eye-piece and disposed adjacent the surface of the cylinder, the arrangement of said symbols on the cylinder and the operative connection between the cylinder and eye-piece being correlated with one another and with the optical unit whereby a substance producing a principal spectral line of one of the elements noted on the cylinder will have its symbol indicated upon the cylinder by the pointer when such spectral line is seen through said eye-piece.

3. A mechanism for analyzing a spectrograph, comprising a support for a film bearing a spectrographic record, the support having a wave length scale thereon, a pointer disposed before said support and adapted to move over the scale thereon for facilitating selection of a line on said record, a sight tube supported in front of said support for movement lengthwise of the scale and directed toward the support and scale for scanning the spectral lines appearing upon the record film mounted on the support, a cylinder supported for rotation upon an axis extending lengthwise of the film support, said cylinder having symbols of elements arranged in a helical series thereabout, means coupling the cylinder with said sight-tube which is so constructed and arranged that movement of the sight-tube longitudinally of a supported film and rotation of the cylinder are simultaneously effected, a pointer connected with the sight-tube and disposed adjacent the cylinder and movable with the tube longitudinally of the cylinder, and said cylinder, sight-tube carrier and support being so cooperatively related that a particular spectral line designated by the first pointer on said supported film and viewed through the sight-tube will be identified by the second pointer indicating upon the cylinder the symbol of the element which produced the line.

4. In an apparatus of the character described for making a spectral analysis, a casing having a front wall, a light receiving opening in said front wall, means arranged before said opening for subjecting to a flame a specimen for analysis, an optical unit within the casing remote from but alined with said light opening and having directed toward said opening a concave face having diffraction lines to form from a light beam falling thereon two identical spectral bands viewable along two divergent paths between which the initial light beam passes, said front wall being provided at opposite sides of the light opening with two elongated window slots formed in an arc having its center at the center of said unit, an eye-piece disposed before one of said windows, supporting means for moving the eye-piece lengthwise of the window on said arcuate path, a cylindrical element symbol carrying index disposed beneath the eye-piece for rotation on an axis extending lengthwise of said window, means coupling the eye-piece with the index which is so constructed and arranged that movement of the eye-piece and rotation of the index are simultaneously accomplished, a film housing disposed over the other one of the windows, means for supporting a film in said housing to extend lengthwise of the adjacent window, shutter means for exposing the film, and a pointer connected with said eye-piece and coacting with said index to designate on the index the symbol of an element producing a spectral line appearing in the eye-piece.

5. Apparatus for making a spectral analysis comprising in association with a spectrum band producing optical unit and means for directing a light beam thereon for analysis, an electric circuit controlling light sensitive cell, means supporting such cell for movement in a path facilitating the reception of light rays from lines of the spectrum onto the sensitive element of the cell, an index cylinder supported for rotation on an axis extending lengthwise of the path of movement of the cell, a pointer supported adjacent to said cylinder and operatively coupled with said cell whereby it will be moved lengthwise of the cylinder upon movement of the cell, said cell and cylinder being operatively coupled to effect the rotation of the cylinder simultaneously with movement of the cell, said cylinder having symbols of elements arranged thereabout in a helical series for selective designation by said pointer, and an electric circuit including therein, said cell, a source of electric potential and a current flow indicating instrument, the said cell, cylinder and pointer being so cooperatively related that the reception by the cell of light rays from any line present in the spectrum will be indicated by said instrument and the symbol of the element producing such line will be indicated upon the cylinder by said pointer.

6. In an instrument for making a spectral analysis, means for submitting a specimen to an electric arc, an optical unit for forming two identical spectra from a light beam falling thereon, said unit being arranged to receive such light beam from the said arc, means for directing a narrow light beam from the arc to said unit, means at one side of the beam by which a graphic record of one spectrum may be formed, a scanner upon the other side of the beam which is directed toward the unit and supported for movement to scan the other spectrum formed by the unit, and a spectral line identifying means coupled with the scanner.

7. An instrument for making a spectral analysis, comprising a housing having a front wall provided with two horizontally extending elongated window openings, means disposed in front of said front wall for subjecting a specimen to an electric arc, a light receiving unit disposed between said means and said wall for receiving light from the arc and directing the same through an opening in the wall and longitudinally through the housing toward the rear thereof, an optical unit at the rear of said housing having a concave diffraction grating face disposed to receive said light beam and to form two identical spectra for observation simultaneously from said windows, means extending across one of said windows for forming a graphic record of one spectrum, a scanner disposed in front of and movable lengthwise of the other window to be directed toward a line in the other spectrum, a rotary index cylinder mounted upon a rotary axis extending in the direction of the path of movement of the scanner, said cylinder having symbols of elements marked thereon, an operative coupling between said scanner and said cylinder which is so constructed and arranged that rotation of the cylinder and movement of the scanner are effected simultaneously, and means connected to and movable with the scanner for designating upon the cylinder the symbol of an element producing a spectral line toward which the scanner is directed.

8. An instrument for making a spectral analysis, comprising a housing having a front wall provided with two horizontally extending elongated window openings, means disposed in front of said front wall for subjecting a specimen to an electric arc, a light receiving unit disposed between said means and said wall for receiving light from the arc and directing the same through an opening in the wall and longitudinally through the housing toward the rear thereof, an optical unit at the rear of said housing having a concave diffraction grating face disposed to receive said light beam and to form two identical spectra for observation simultaneously from said windows, means extending across one of said windows for forming a graphic record of one spectrum, a scanner disposed in front of and movable lengthwise of the other window to be directed toward a line in the other spectrum, a rotary index cylinder mounted upon a rotary axis extending in the direction of the path of movement of the scanner, said cylinder having symbols of elements marked thereon, an operative coupling between said scanner and said cylinder which is so constructed and arranged that rotation of the cylinder and movement of the scanner are effected simultaneously, means connected to and movable with the scanner for designating upon the cylinder the symbol of an element producing a spectral line toward which the scanner is directed, a wheel mounted coaxially with the cylinder for rotation therewith and having graduations in A units thereon, and a stationary pointer overlying the graduations of said wheel.

9. An instrument for making a spectral analysis, comprising an elongated casing having a transversely arcuate wall at one end, a spectrum forming optical unit supported at the other end of the casing on the radial center of said arcuate wall, means for subjecting a specimen to a flame for analysis, means for directing a light beam from said flame onto said unit, said wall having a slot extending lengthwise thereof and across the casing, an eye piece supported for movement lengthwise of the slot and directed toward said unit for viewing a spectrum formed thereby, a rotatably mounted cylinder, a driving coupling between the cylinder and eye piece by which movement of the eye piece and turning of the cylinder occur together, said cylinder having element symbols thereon, a pointer connected with the eye piece to move therewith and arranged to designate different symbols on the cylinder, said unit, eye piece, pointer and connection between the eye piece and cylinder being so relatively adjusted that the pointer will designate a symbol when the eye piece is directed on a principal line produced in the spectrum by the element identified by such symbol, a rotary wave length scale connected with the cylinder to turn therewith, and a fixed pointer for said scale, said scale and pointer facilitating identification of a spectral line of an element by wave length when such element symbol is not found on the cylinder.

10. An instrument for making a spectral analysis, comprising an elongated casing, an optical unit in one end of the casing designed to form a spectrum when a light beam from an incandescent specimen falls thereon, an elongated opening formed at the other end of the casing on an arc struck from the center of the unit, a guide extending transversely of the said other end of the casing, a standard supported upon said guide for sliding movement longitudinally thereon, a scanner carried by said standard and directed through said opening toward said unit for scanning a spectrum formed by the unit, means for subjecting a specimen to a flame and conducting a light beam therefrom to said unit, a cylinder mounted for rotation on an axis extending longitudinally of said guide, said cylinder having a helical groove therein extending from one end to the other, means coupled with said standard and engaging in said groove to effect movement of the standard and scanner longitudinally of the opening upon turning of the cylinder, a pointer coupled with the standard to move therewith and lying adjacent the surface of the cylinder, and said cylinder having symbols of elements on the surface thereof, one of which is indicated by the pointer when the scanner is directed toward a principal spectral line of the indicated element.

11. An instrument for making a spectral analysis, comprising an elongated casing, an optical unit in one end of the casing designed to form a spectrum when a light beam from an incandescent specimen falls thereon, an elongated opening formed at the other end of the casing on an arc struck from the center of the unit, a guide extending transversely of the said other end of the casing, a standard supported upon said guide for sliding movement longitudinally thereon, a scanner carried by said standard and directed through said opening toward said unit for scanning a spectrum formed by the unit, means for subjecting a specimen to a flame and conducting a light beam therefrom to said unit, a cylinder mounted for rotation on an axis extending longitudinally of said guide, said cylinder having a helical groove therein extending from one end to the other, means coupled with said standard and engaging in said groove to effect movement of the standard and scanner longitudinally of the opening upon turning of the cylinder, a pointer coupled with the standard to move therewith and lying adjacent the surface of the cylinder, a light sensitive cell forming a part of said scanner to be effected by light from the spectral lines, an electric current carrying circuit having said cell therein and having a current flow measuring instrument connected therein whereby light acting on the cell will be indicated by fluctuation of said instrument, and said cylinder having symbols of elements thereon one of which is indicated by the pointer when the scanner is directed toward and receives light from a principal spectral line of the indicated element as shown by fluctuation of said instrument.

12. In an instrument designed for making a spectrographic analysis, a light beam receiving optical unit having a surface formed to reflect identical spectral bands viewable along two diverging paths, means for guiding a light beam to the optical unit, movable means for scanning one of said bands, means associated with said scanning means for identifying an element producing a particular spectral line in the scanned band when such line is received in the scanning means, and a light sensitive means arranged to receive light rays from the spectral lines of the other band and adapted to form a photographic record of the same.

13. An instrument of the character described, including a casing and means for subjecting to a flame a specimen for analysis, means for receiving a light beam from the flame and conducting the same into the casing, an optical unit disposed in the casing in a position to receive such light beam and formed to produce a spectral band therefrom, said casing having an elongated window in a wall thereof arranged at a point remote from the unit to receive reflected light rays from the unit, an eye-piece supported exteriorly of the casing for movement lengthwise of said window along an arcuate path having said unit at its radial center and directed toward the unit whereby said spectral band may be scanned, a cylinder supported for rotation on its long axis with said axis extending lengthwise of the window, the cylinder having an element index formed spirally thereabout, a pointer overlying the cylinder index and an operative coupling between the eye-piece and cylinder for effecting movement of the eye-piece upon rotation of the cylinder, said coupling supporting the pointer and moving the same on a straight path lengthwise of the cylinder, said index, eye-piece and optical unit being so correlated that an element producing a particular spectral line will be identified on said index by said pointer when such spectral line is viewed through the eye-piece.

14. An instrument for making a spectroscopic analysis, comprising a casing having a wall provided with an arcuate window, an optical unit supported within the casing and designed to form a spectrum from a light beam falling thereon, means for directing a light beam through a wall of the casing onto said unit, said spectrum being viewable through said window, a bar supported adjacent to and extending lengthwise of the window, a cylinder supported for rotation on an axis extending parallel with the bar, said cylinder having a spiral groove therearound and having symbols of elements thereon along said groove, an arm pivotally supported at an end beneath said unit and extending across said bar, a post supported vertically on said arm and extending across said window, a sight tube carried by the post and directed through the window toward said unit and movable upon oscillation of the arm along the arcuate path of the opening, a slide member supported upon said bar, means carried by the slide member engaging in the cylinder groove to effect movement of the slide on the bar upon rotation of the cylinder, a sliding resilient coupling between the slide and the arm by which simultaneous movement of the slide along a straight path and of said post along an arcuate path is accomplished, and a symbol designating pointer coupled with the slide for rectilinear movement longitudinally of the cylinder.

15. In an instrument for making a spectral analysis, means for submitting a specimen to an electric arc, an optical unit designed to form a spectrum from a light beam falling thereon, said unit being arranged to receive such light beam from said arc, means for directing a narrow light beam from the arc to said unit, means at one side of the beam which is movable in a fixed path for optically scanning the spectrum produced by the unit, a light sensitive cell arranged to receive the light from said unit independently of said scanning means through a narrow light receiving opening, an operative coupling between the scanning means and said cell whereby the two may be moved as a unit to obtain the maximum effect of light from a spectral line while being viewed through the scanning means, an electric circuit having said cell and a current flow detector therein, and an identifying means for a spectral line in the view of the scanner and whose light ray produces a current flow through said instrument operatively coupled with said scanning means for identifying the elements producing the said spectral line.

FRANK P. SMITH.